United States Patent
Nave et al.

(10) Patent No.: US 7,533,370 B2
(45) Date of Patent: May 12, 2009

(54) SECURITY FEATURES IN ON-LINE AND OFF-LINE DELIVERY OF APPLICATIONS

(75) Inventors: Itay Nave, Kfar Hess (IL); Ohad Sheory, Neve-Monosson (IL)

(73) Assignee: Exent Technologies, Ltd. (IL)

( * ) Notice: Subject to any disclaimer, the term of this patent is extended or adjusted under 35 U.S.C. 154(b) by 978 days.

(21) Appl. No.: 10/815,962

(22) Filed: Apr. 2, 2004

(65) Prior Publication Data

US 2005/0091534 A1 Apr. 28, 2005

Related U.S. Application Data

(63) Continuation of application No. 10/694,435, filed on Oct. 28, 2003, now abandoned.

(51) Int. Cl.
G06F 9/44 (2006.01)
G06F 9/00 (2006.01)
G06F 7/04 (2006.01)

(52) U.S. Cl. .................. 717/126; 713/165; 726/30; 726/31; 726/32; 726/33

(58) Field of Classification Search .............. None
See application file for complete search history.

(56) References Cited

U.S. PATENT DOCUMENTS

| 4,525,599 | A | 6/1985 | Curran et al. |
| 5,925,127 | A | 7/1999 | Ahmad |
| 6,539,501 | B1 | 3/2003 | Edwards |
| 6,609,198 | B1 * | 8/2003 | Wood et al. ............. 713/155 |
| 7,185,364 | B2 * | 2/2007 | Knouse et al. .............. 726/8 |
| 2005/0086538 | A1 * | 4/2005 | Kubota ................. 713/201 |

OTHER PUBLICATIONS

International Search Report, issued in International Appl. No. PCT/US04/35442 on Apr. 18, 2006, 4 pages.

* cited by examiner

*Primary Examiner*—Chuck O Kendall
(74) *Attorney, Agent, or Firm*—Sterne, Kessler, Goldstein & Fox P.L.L.C.

(57) ABSTRACT

A method and system for determining whether a client is attempting to copy an application or use the application without authorization. First, data for at least one prediction log file for the application is created. Then, based on the at least one prediction log file, prediction knowledge is determined for the application, where the prediction knowledge is stored in a prediction file. The prediction file is then forwarded to the client executing the application. It is then determined by using the predication file whether the client is attempting to copy the application or use the application without authorization. If the client is attempting to copy the application or use the application without authorization, then the client's access to the application is terminated. In an offline mode, usage information is bound to user saved data such that modification of usage information renders user saved data unusable. This prevents unauthorized access to an offline delivered application.

20 Claims, 18 Drawing Sheets

SECURITY FEATURES IN ON-LINE AND OFF-LINE DELIVERY OF APPLICATIONS

BACKGROUND OF THE INVENTION

1. Field of the Invention

This technology relates generally to delivery of applications across a network.

2. Related Art

The delivery of applications from a server to client across a network has become commonplace. Examples of such applications include utilities, games, and productivity applications. Nonetheless, the delivery process is not necessarily convenient or secure. Considerable amounts of data need to be transferred for the complete delivery of an application, and a complete download may take hours in some circumstances. This may be followed by a cumbersome installation process. Moreover, such transactions may be further complicated by security considerations. A user may need to be authenticated, for example. Additionally, there may be a need to determine whether the unauthorized copying and/or use of the application is occurring while the client is engaged in an active session with the application.

A common problem in the distribution of software is the management of digital rights and the threat of piracy. Ideally, from the point of view of the vendor, a software package would be sold to a buyer, and that buyer would be the only party licensed to use the software. Unlicensed copying and/or use of the software, i.e. pirating, obviously represents a financial loss to the software vendor. Currently, when a vendor sells a software package in the retail environment, the user may have to enter a code, typically printed on the back of the packaging during the installation process. This effectively marks the installation and links it to the copy of the software media, such as a CD. This code can be thought of as a CD key. Any user of the software must now present the CD to the computer on which the program is installed before operating the application. Any attempt to operate the installed application without the CD is not authorized, and is effectively disabled.

Obviously, such a mechanism cannot be used in the on-line distribution of an application. In such a transaction there is no packaging and there is no CD key presented to the user. Nor is there a CD to be used as a token that would allow use of the application.

Hence there is a need for a system and method by which unauthorized copying and/or use of an application can be controlled, given that the application is accessed over a network (i.e., accessed in online mode).

As described above, an application can be accessed and executed in online mode. An application can also be accessed and executed in offline mode. In offline mode, the application is completely downloaded to the user's computer, the user is given a compact disk, etc. Because the user has complete control over the application, it is difficult to terminate the user's access to the application. Hence there is a need for a system and method to limit or terminate a user's access to an application in offline mode.

SUMMARY OF THE INVENTION

Further embodiments, features, and advantages of the present invention, as well as the structure and operation of the various embodiments of the present invention, are described below with reference to the accompanying drawings.

The present invention includes a method and system for determining whether a client is attempting unauthorized copy and/or use of an application. First, at least one prediction log file for the application is created. Then, based on the at least one prediction log file, prediction knowledge is determined for the application, where the prediction knowledge is stored in a prediction file. The prediction file is then forwarded to the client executing the application. It is then determined by using the prediction file whether the client is attempting to copy and/or use the application. If the client is attempting to copy and/or use the application without authorization, then the client's access to the application is terminated.

The invention also includes a system and method for protection against unauthorized use of an application in an offline mode. Here, user saved data is bound with usage information, so that any unauthorized attempt to access the usage information corrupts the user saved data, deterring or preventing further use of the application.

Further embodiments, features, and advantages of the present invention, as well as the structure and operation of the various embodiments of the present invention, are described below with reference to the accompanying drawings.

DETAILED DESCRIPTION OF THE INVENTION

A preferred embodiment of the present invention is now described with reference to the figures, where generally like reference numbers indicate identical or functionally similar elements. Also in the figures, generally the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Table of Contents

I. System overview
II. Prediction Based Security
III. Offline Security
IV. Computing Context
IV. Conclusion I. System Overview The present invention relates to the streaming of software applications over a network, such as but not limited to the Internet, to a client computer (hereafter client). The invention permits the transfer of the application and related information to take place quickly, efficiently, and with minimal inconvenience to the user. Thus, the experience of the user with the software content is not affected by the fact that delivery of the application takes place across a network.

Figure 1:
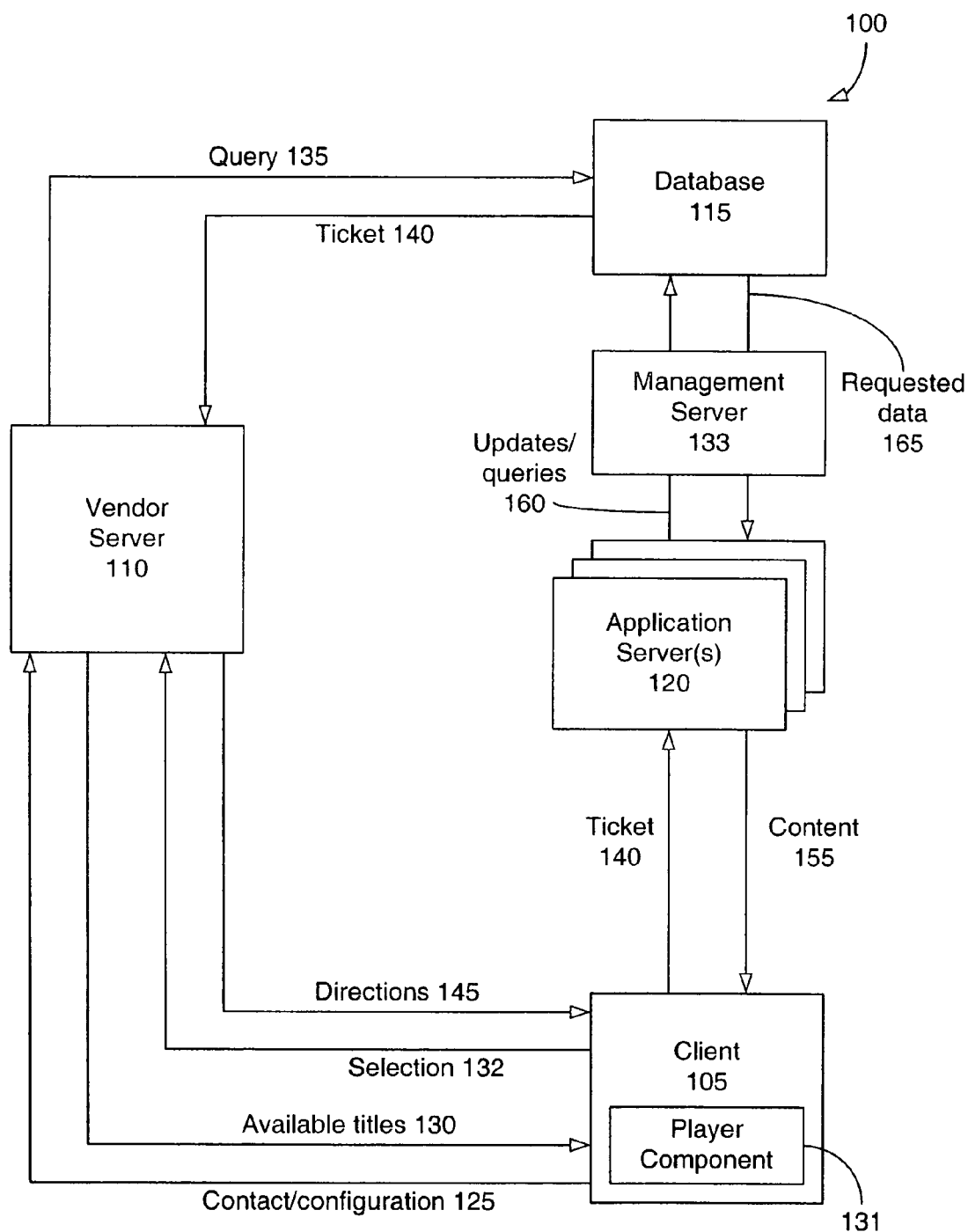
FIG. 1 is a block diagram illustrating a system for the on-line delivery of application programs to a client according to an embodiment of the invention.

Referring to FIG. 1, a system for allowing streaming of software content includes a client machine 105, a vendor server 110, a database 115, at least one application server 120, and a management server 133. The vendor server 110 and management server 133 share access to the database 115. The client includes a player software component 131 installed prior to the start of a session. The player 131 controls the client interactions with the application server 120. The player 131 is installed on the client 105 only once. Thus, if the user previously installed the player 131 in an earlier session, there is no need to reload the player 131. The vendor server 110 hosts a web site from which the user can select one or more software applications (i.e., titles) for execution.

The application server 120 stores the contents of various titles. Multiple application servers 120 may be organized as a virtual file system to permit load balancing, reduce the required file server network bandwidth, and provide access to a large number of titles. The management server 133 communicates with the application server 120 to receive information on current sessions and communicates with the database 115 to log information on the current sessions. The management server 133 functions as a buffer between the application server 120 and the database 115, and may implement such functions as load management and security functions.

The database 115 catalogs the address(es) of the application server(s) 120 for each offered title and logs the user's session data as the data is reported from the management server 133. The database 115 coordinates load management functions and identifies an application file server 120 for the current transaction.

The user starts the session at the client 105 by visiting a web page hosted by the vendor server 110. The communication between the client 105 and the vendor server 110 can be enabled by a browser such as Explorer or Netscape using the hypertext transfer protocol (http), for example. A variety of titles cataloged in the database 115 are offered on the web page for client execution. If the player 131 has been installed on the client 105, a plugin (in the case of Netscape) or ActiveX Control (in the case of Explorer) on the client 105 identifies the hardware and software configuration of the client 105. Hence the initial contact from the client 105 to vendor server 110 is shown as communication 125. The vendor server 110 compares the identified configuration to the requirements (stored on the database 115) of the applications being offered for rental. The user is then notified by the vendor server 110 which titles 130 are compatible with the client's configuration.

The user selects a title through an affirmative action on the web page (e.g., clicking a button), shown as communication 132. In response, the vendor server 110 calls a Java Bean that is installed on the vendor server 110 to request information stored on the database 115. This request is shown as query 135. The requested information includes which application server 120 stores the title and which application server 120 is preferable for the current user (based on, for example, load conditions and established business rules). The database 115 sends this requested information (i.e., a ticket 140) back to the vendor server 110, which, in turn, passes the ticket 140 and additional information to the client 105 in the form of directions 145. The ticket 140 may contain multiple parameters, such as the user identity and information about the rental contract, or agreement, (e.g., ticket issue time (minutes) and expiration time (hours)) previously selected by the user in the web site. The ticket 140, created by the Java Bean using information in the database 115, is encrypted with a key that is shared between the Java Bean and the application server 120. The directions include the ticket 140 and additional information from the database 115 that is needed to use the application and to activate the player 131. The directions 145 may also include an expiration time that is contained in the ticket. The Java Bean creates the directions 145 using information in the database 115. The directions 145 can be encrypted with a static key that is shared between the Java Bean and the client 105, and are protected using an algorithm such as the MD5 message digest algorithm.

After the directions 145 are passed from the vendor server 110 to the client 105, no additional communication occurs between the client 105 and the vendor server 110—the player 131 only communicates with the application server 120 and its virtual file system for the rest of the active session. The client 105 may post error notifications to the vendor server 110 for logging and support purposes. Receipt of the ticket 145 by the client 105 causes the player 131 to initialize and read the directions 145. The directions 145 tell the player 131 which application has been requested, provide the address of the application server 120 for retrieval, and identify the software and hardware requirements needed for the client 105 to execute the selected title, such as the amount of software content to be cached before starting execution of the selected title. If the client 105 lacks the software and hardware requirements, or if the operating system of the client 105 is not compatible with the selected title, the client 105 displays a warning to the user; otherwise the transaction is allowed to continue.

The player 131 initiates a session with the specified application server 120 by providing the ticket 140 in encrypted form to the application server 120 for validation. If the validation fails, an error indication is returned to the player 131, otherwise the player 131 is permitted to connect to the application server 120 to receive the requested software content. In response to the player 131 initiation of the session, the application server 120 provides information, including encrypted data, to the client 105. This initialization information includes a decryption key, emulation registry data (i.e., hive data) for locally caching on the client 105, and a portion of the software content that must be cached, or "preloaded", before execution can start. Emulation registry data is described in U.S. patent application Ser. No. 09/528,582, filed Mar. 20, 2000, incorporated herein by reference in its entirety.

After initialization is completed and execution begins, additional encrypted software content blocks are streamed to the client 105 in a background process. The player 131 decrypts the streamed content using the decryption key provided by the application server 120 in the initialization procedure. Part of the software content is loaded into a first virtual drive in client 105 for read and write access during execution. The other software content is loaded into a second virtual drive in client 105 for read only access. During execution of the software content, the player 131 intercepts requests to the client 105's native registry and redirects the requests to the emulation registry data, or hive data. The emulation registry data allows the software content to be executed as if all the registry data were stored in the native registry. As the session proceeds, the application server 120 sends information to the management server 133 to be logged in the database 115. The application server 120 continues to write to the management server 133 as changes to the state of the current session occur.

The player 131 executes a predictive algorithm during the streaming process to ensure that the necessary software content is preloaded in cache prior to its required execution. As execution of the title progresses, the sequence of the software content streamed to the client 105 changes in response to the user interaction with the executing software. Consequently, the streaming of the software content meets or exceeds the "just in time" requirements of the user's session. Player 131 requests to the application server 120 for immediate streaming of specified portions of the software content immediately required for execution at the client 105 are substantially eliminated. Accordingly, the user cannot distinguish the streamed session from a session based on a local software installation.

After the user has completed title execution, the player 131 terminates communication with the application server 120. Software content streamed to the client 105 during the session remains in the client cache of client 105. The virtual drives are removed (i.e., disconnected), however. Thus the streamed software content should be inaccessible to the user. In addition, the link between the emulation registry data in cache and the client 105's native registry is broken. Consequently, the client 105 should be unable to execute the selected title after session termination even though software content data is not removed from the client 105.

In an optional feature, the player 131 periodically (e.g., every few minutes) calls a "renew function" to the application server 120 to generate a connection identifier. If the network connection between the player 131 and the application server 120 is disrupted, the player 131 can reconnect to the application server 120 during a limited period of time using the connection identifier. The connection identifier is used only to recover from brief network disconnections. The connection identifier includes (1) the expiration time to limit the time for reconnecting, and (2) the application server identification to ensure the client 105 can connect only to the current application server 120. The connection identifier is encrypted using a key known only to the application server 120, because the application server 120 is the only device that uses the connection identifier.

In another optional feature, the management server 133 verifies the validity of the session. If an invalid session is identified according to the session logging the application server 120, a flag is added to a table of database 115 to signal that a specific session is not valid. From time to time, the application server 120 requests information from the management server 133 pertaining to the events that are relevant to the current sessions. If an invalid event is detected, the application server 120 disconnects the corresponding session. The delayed authentication feature permits authentication without reducing performance of the executing software content.

For illustrative purposes, the foregoing has been described with reference to particular implementation examples, such as Explorer, Netscape, Java, ActiveX, etc. Such references are provided as examples only, and are not limiting. The invention is not restricted to these particular examples, but instead may be implemented using any applications, techniques, procedures, tools, and/or software appropriate to achieve the functionality described herein.

II. Prediction Based Security

As mentioned above, the player 131 communicates with the application server 120 and its virtual file system during an active session. Although it is the intent for the client 105 to not be able to access the streamed software content during the active session, this is not always the case. Some users are able, through trial and error or other software hacking mechanism, to access the file system and copy the software content stored in the virtual file system or use the software content in an unauthorized way. Once all of the software content of the software application is copied, the user can then illegally distribute the software application.

In general, the present invention detects abnormality in an application (but is not limited to this) by using a statistical model based on a large amount of the application's behavior data. This behavior data may be collected from users using the specific application to achieve a real indication of the patterns of behavior of the application. This real indication of the patterns of behavior of the application is then used to detect abnormalities.

In general, although computer software applications are very complex they also behave under very strict rules. Thus, computer software applications operate with very deterministic behavior. More specifically, some of the input output (I/O) access of an application to the file system in which it is installed includes highly deterministic patterns.

Most software packages are made up of about 5% of executable code and 95% of data, where the executable code uses the data to perform tasks. In an embodiment of the present invention, it is the task behavior of the executable code, and in particular the reading and writing of data, that is monitored to determine whether an unauthorized copy and/or use of the application are currently occurring. Thus, if an application is running in an authorized manner, the reading and writing tasks of the executable code and the way data is accessed by the executable includes very deterministic patterns. If on the other hand, the application is not running in an authorized manner (e.g., being copied or involved in unauthorized use) then the reading and writing tasks of the executable code and the way data is accessed by the executable will behave differently from its normal deterministic manner.

The present invention solves the problem of a user being able to copy the content of a software application and/or use the application without authorization by predicting, based on blocks of the software content being requested by the user, whether the user is copying or validly executing the software application. Here, blocks of the software content that have a very high probability of being executed a certain distance from one another are put into a sequence. If one block is executed (or read) and another is not, wherein the block should be executed (or read) within the certain distance, this indicates to the present invention that there is an abnormality of behavior for the application. Once this is determined, then the connection between the user and the application is terminated.

Figure 2:
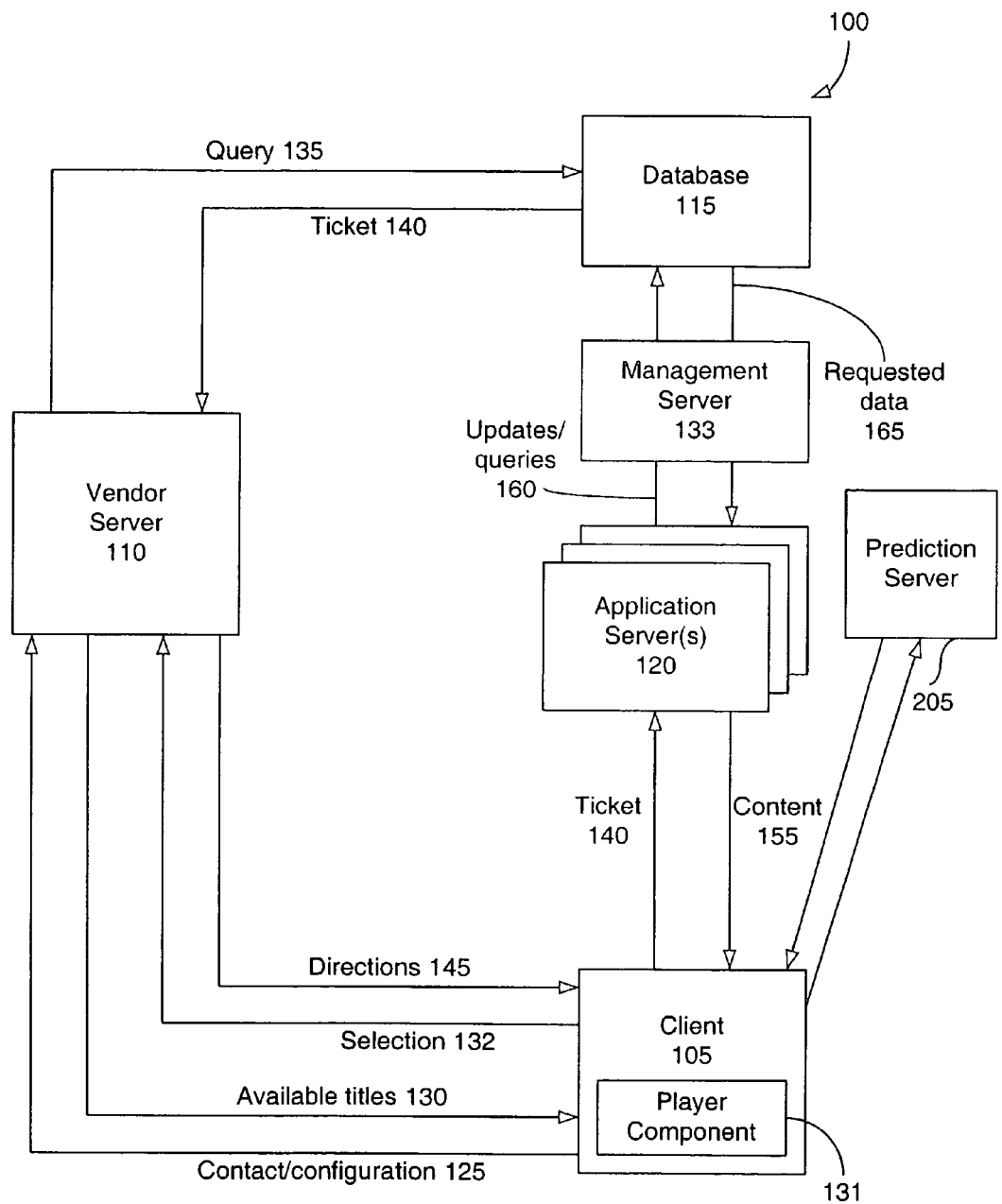
FIG. 2 is a block diagram illustrating the system of FIG. 1 with the prediction server according to an embodiment of the invention.

Each application stored on the application server(s) 120 (FIG. 1) is organized into blocks of data (representative of the software content). Some of these blocks are required every time the application is launched or at start up time. Other blocks are only required when the user uses a specific part of the application. Thus, for certain parts of an application as it is being executed, the present invention determines with varying certainty which blocks of data will be accessed via a predictive algorithm. The present invention compares which blocks of data are actively being requested by the client 105 and makes a determination as to whether it is likely the user is trying to copy the application and/or use the application without authorization. FIG. 2 is described next with reference to this prediction based security invention.

FIG. 2 illustrates an overview of the prediction based security invention and how it interacts with the components already described above with reference to FIG. 1. As shown in FIG. 2, a prediction server 205 communicates with the client 105 (via the player 131).

In order to predict which blocks of the application are likely to be accessed once a certain block is accessed by the client 105, the player 131 builds a prediction thread from a list of all bocks that have been accessed by the application. In an embodiment of the present invention, the prediction thread is represented in three tables, as will be described in more detail with reference to FIGS. 5-7 below. The player 131 saves the prediction thread to a prediction log file during the execution or active session of an application. The player 131 sends the prediction log file to the prediction server 205 during the active session and also once the application terminates.

An initial prediction log file may be generated based on information regarding behavior of the average user. As the prediction server 205 processes an increased number of prediction log files, the prediction becomes more reliable regarding the determination of whether there is an attempt to copy and/or use the application. The method of prediction based security is described in detail below with reference to FIGS. 4-13. The prediction server 205 is further described next with reference to FIG. 3.

Figure 3:
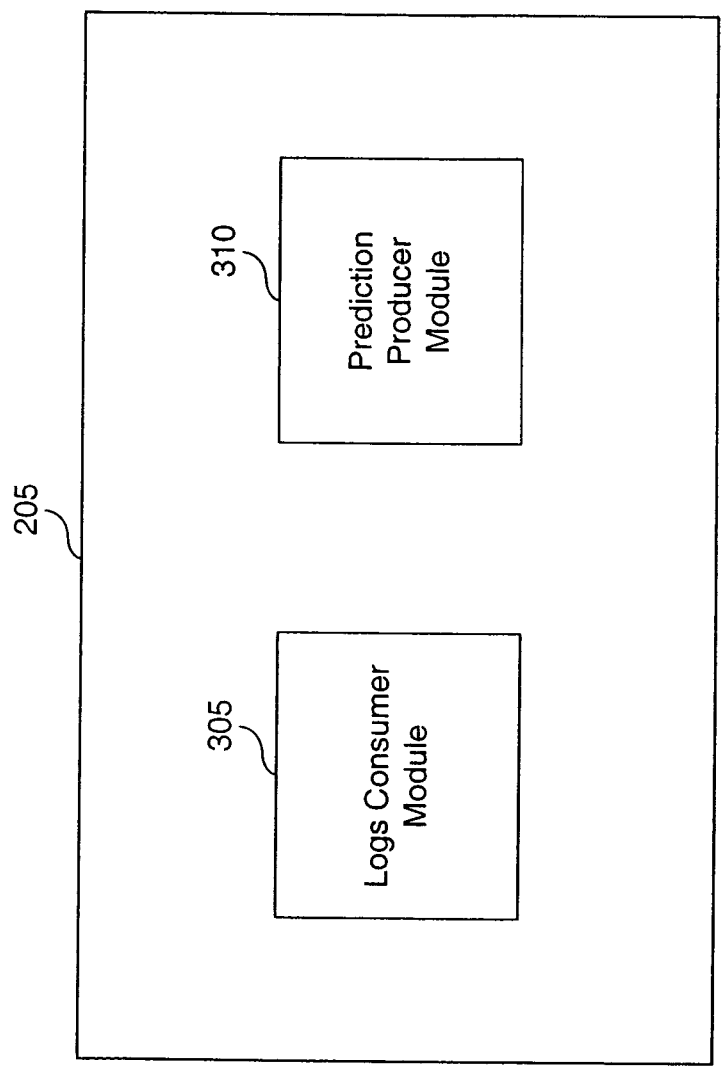
FIG. 3 is a block diagram illustrating various modules of the prediction server according to an embodiment of the invention.

Referring to FIG. 3, the prediction server 205 is comprised of a logs consumer module 305 and a prediction producer module 310. The role of the logs consumer module 305 is to collect the prediction log files and save them to disk. The role of the prediction producer module 310 is to process the prediction log files for each application and to generate a prediction file for each application. In an embodiment of the present invention, modules 305 and 310 typically run in parallel and are synchronized with each other. In addition, the prediction server 205 may have two web interfaces (not shown in FIG. 3). One of these web interfaces is used for collecting prediction log files from the player 131, while the other is used for supplying prediction files to the player 131. The operation of the present invention is described next with reference to FIG. 4.

Figure 4:
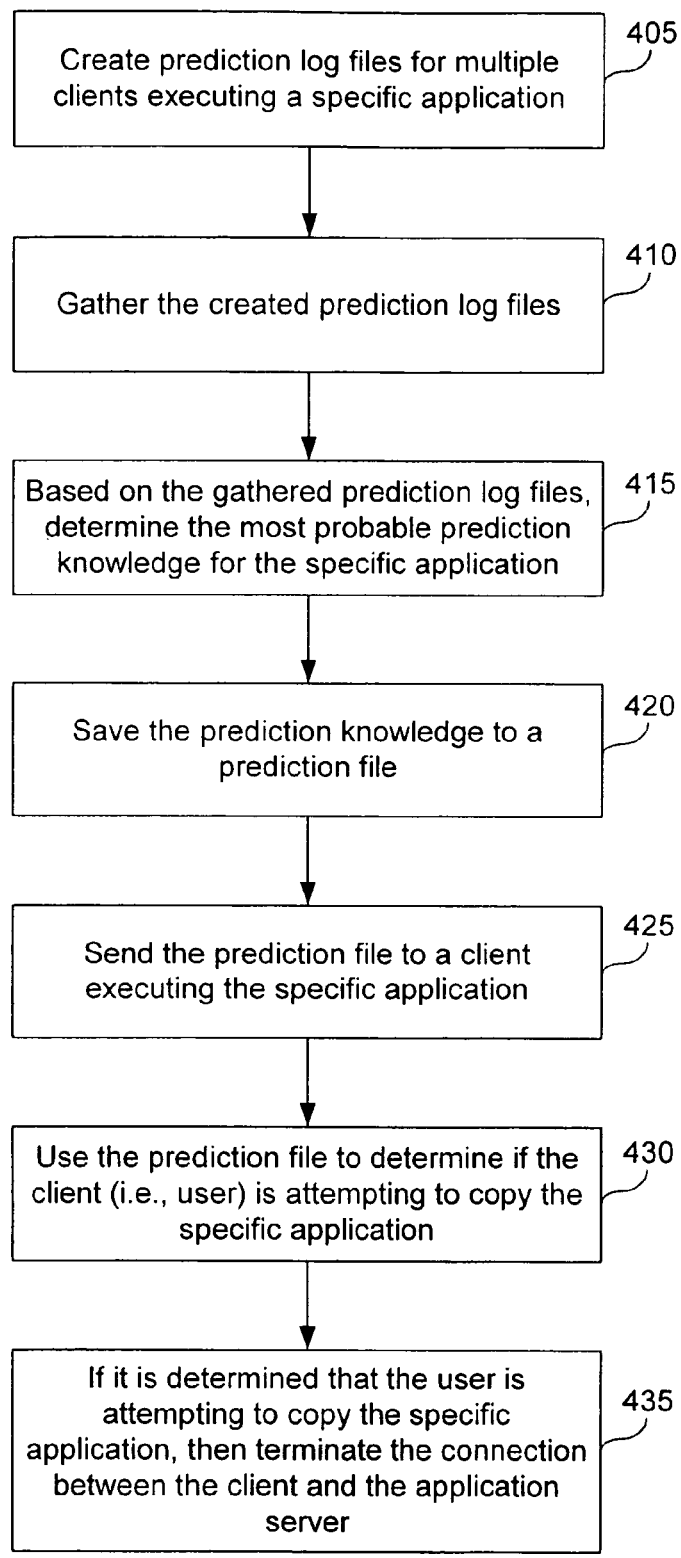
FIG. 4 is a flowchart illustrating the high level operation of the prediction based security invention according to an embodiment of the invention.

FIG. 4 is a flowchart that illustrates the high level operation of the prediction based security invention. The flowchart starts at step 405, where prediction log files are created for multiple respective clients executing a specific application via a predictive algorithm. As described above, the player 131 builds a prediction thread from a list of all blocks that have been accessed for the application to create the prediction log file for its client. The player 131 sends the prediction log file to the prediction server 205 during the active session and also once the application terminates. Step 405 is described in more detail below with reference to FIG. 8. Control then passes to step 410.

In step 410, the created prediction log files are gathered by the prediction server 205 for further analysis in step 415.

In step 415, the prediction server 205, based on the gathered prediction log files, determines the most probable prediction knowledge for the specific application. In general, the prediction server 205 looks at all of the gathered prediction files and determines with varying certainty (for certain parts of an application as it is being executed) which blocks of data will be accessed given that a certain block of data has already been accessed.

In step 420, the prediction server 205 saves the prediction knowledge to a prediction file.

In step 425, the prediction file is sent to a client 105 currently executing the specific application.

In step 430, the player 131 (of client 105) uses the prediction file to determine if the client 105 (i.e., user) is attempting to copy and/or use the application without authorization. Step 430 is described in more detail below with reference to FIG. 13.

In step 435, if the user is attempting to copy and/or use the application without authorization, then the connection between the client 105 and the application server 120 is disconnected. The flowchart in FIG. 4 ends at this point.

Note that apart from the security function, prediction has an operational function as well. Client 105 can use the prediction process to determine what blocks are to be read from the application server 120. If the application requests block A where blocks B and C are predicted to be required next, then the prediction client will ensure that when the application requests these latter blocks, they will have been obtained and already available in the local cache. This allows for faster, more efficient processing.

As described above with reference to step 405 of FIG. 4, the player 131 builds a prediction thread from a list of all blocks that have been accessed by the application to create the prediction log file for its client. In an embodiment of the present invention, the prediction log file and prediction thread are represented by three tables, including a connection table, a count table and an appearance table. The present invention is not limited to these three tables. Individual records of each of these tables are described next with reference to FIGS. 5-7. The description of the tables will facilitate the understanding of FIG. 8 that further describes step 405 of FIG. 4.

Figure 5:
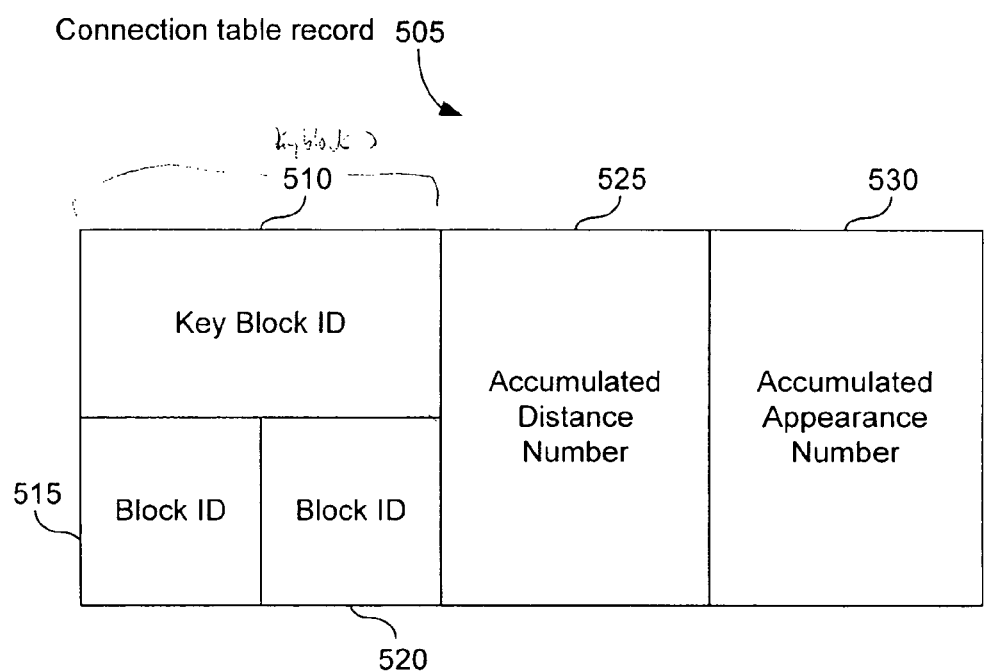
FIG. 5 illustrates a record in the connection table according to an embodiment of the invention.

FIG. 5 illustrates a record 505 of the connection table. In general, the connection table contains data about pairs of block IDs in a sequence. Record 505 includes a key field 510, an accumulated distance number field 525 and an accumulated appearance number field 530. Key block If) field 510 is further comprises of two fields, including block ID field 515 and block ID field 520. Each of these is described next in more detail.

Each block of data in an application is assigned an ID. The key field 510 represents a pair of block IDs (block ID field 515 and block ID field 520) that appear in order in a sequence of IDs. The pair of block IDs in the sequence can be distanced from each other (i.e., other blocks can come between them in the sequence).

The accumulated distance number field 525 represents the distance between two specific block IDs in the sequence. A distance is defined as the number of steps between the two IDs. For example, in the sequence A B C D E (with A, B, etc. representing block IDs), A's distance from E is 4.

The accumulated appearance number field 530 represents the accumulated appearance of a pair of block IDs in the sequence (i.e., the number of times the pair of block IDs are seen together in the sequence). For example, in the sequence A B C D E C A B, the A B pair is seen twice, so that the accumulated appearance number for this pair is two.

The connection table is filled by first determining a value for a look ahead distance (L) variable. L represents the maximum distance that one can pair two block IDs in the sequence. For example, if the sequence is A B C D E and L is three, then the block ID pairs A B, A C and A D would be represented as a record in the connection table. Note that the block ID pair A E would not appear as a record, since these two blocks are four steps apart, which exceeds L=3.

Figure 6:
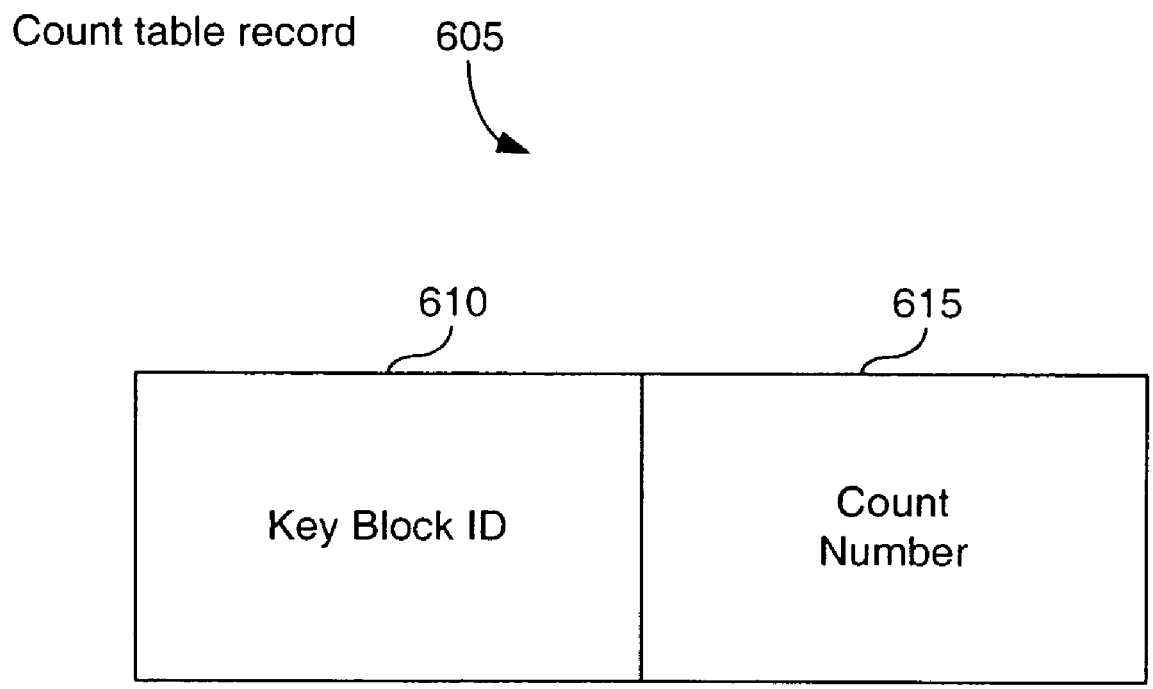
FIG. 6 illustrates a record in the count table according to an embodiment of the invention.

The count table is described next with reference to FIG. 6. The count table contains data about the number of times a block is seen in a sequence. FIG. 6 illustrates a record 605 of the count table. Record 605 includes a key block ID field 610 and a count number field 615. For example, in the sequence A B C D E C A B, the block ID A is seen two times. Hence field 615 contains the count number 2.

Figure 7:
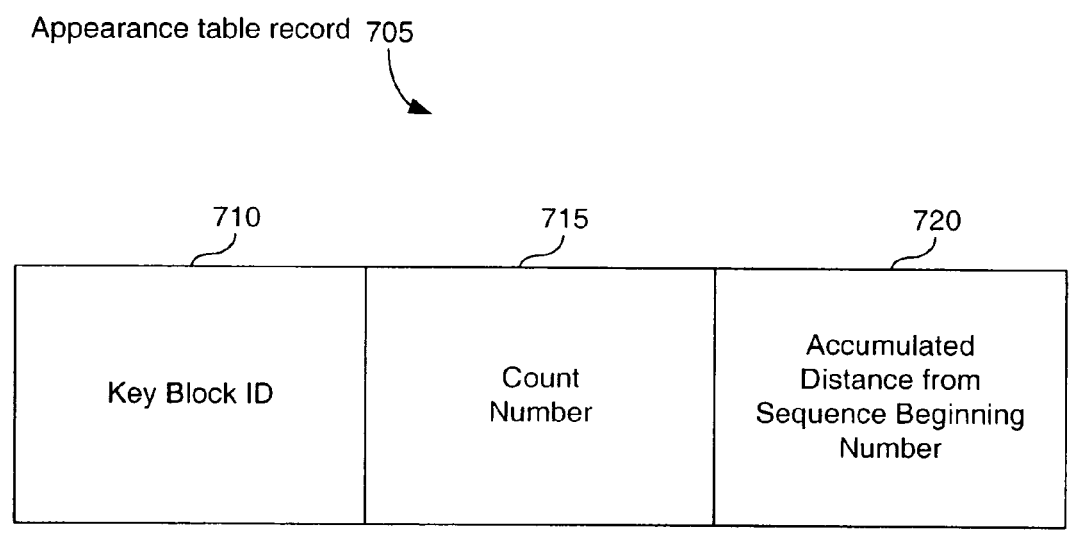
FIG. 7 illustrates a record in the appearance table according to an embodiment of the invention.

The appearance table is described next with reference to FIG. 7. The appearance table contains the number of appearances of block IDs in a sequence and the accumulated distance of a specific block ID from the beginning of the sequence. FIG. 7 illustrates a record 705 of the appearance table. Record 705 includes a key block ID field 710, a count number field 715 and an accumulated distance field 720, where the latter is measured from the sequence beginning. The key block field 710 represents a block ID. The count number field 715 represents the number of times the block ID appears in a specific sequence. The accumulated distance from sequence beginning number field 720 represents the accumulated distance of a specific block ID from the beginning of the sequence.

Figure 8:
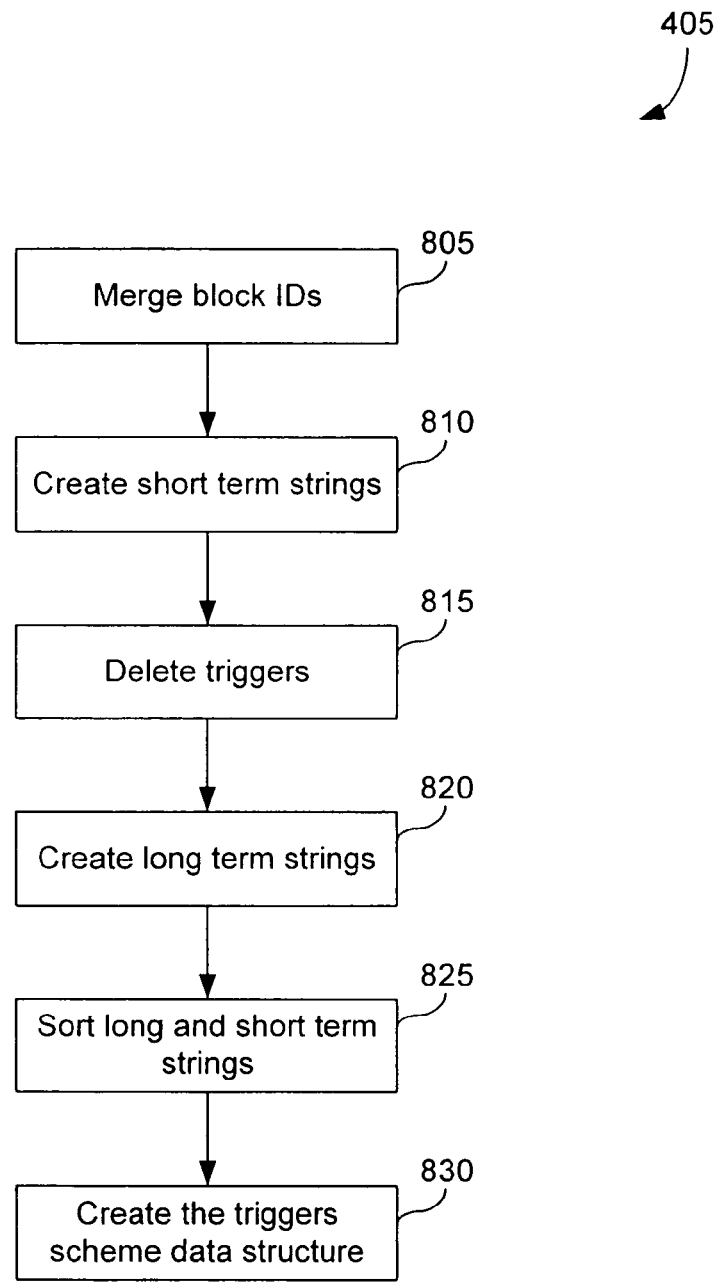
FIG. 8 is a flow chart further describing step 405 of FIG. 4 according to an embodiment of the invention.

Described next with reference to FIG. 8 is a flowchart that illustrates the predictive algorithm (or trigger scheme) utilized by the prediction based security algorithm to create the prediction log files for a client (step 405 of FIG. 4). There are a number of variables that are used by the predictive algorithm that are defined as follows:

Merge minimum probability (MMP): the minimum probability from which two block IDs are merged and thus considered one. Merger is described in greater detail below.

Limit probability for short term (LPShort): the probability limit for predicting short term predicted blocks. Short term refers to a sequence of blocks starting from a current block and extending some relatively short interval. This sequence, or string, can be viewed as the current stage of analysis. Probability limit refers to a threshold probability. A block is predicted to be in a position in a string only if its probability of appearing in this position of the string exceeds the probability limit.

Limit probability for long term (LPLong): the probability limit for predicting long term predicted blocks. Long term refers to a string of blocks beyond (but not including) the current stage.

Minimum prediction string size (Min_String_Size): the minimum number of blocks in a short term string for a block to be considered a trigger for this string. A trigger may be viewed as a block indicating that a string of blocks will, with a certain probability, follow. Examples of a trigger could be when a user opens a certain file, closes a certain file, finishes a certain level in a game, and so forth.

Maximum trigger ratio (MTRatio): the maximum ratio between a trigger appearance count and a predicted block appearance count for the block ID to be considered in a prediction string of the specified trigger.

String grouping size (Gsize): the size in percentage of a group in the short term string.

Some calculations used by the steps in FIG. 8 are as follows, given hypothetical block IDs U, V, and W:

VU average distance=(V U accumulated distance number)/(V U accumulated appearance number). Note that the value for accumulated distance number is found in accumulated distance number field 525 and that the value for accumulated appearance number is found in accumulated appearance number 530.

Probability of a pair=((V U accumulated appearance)$^2$)/(V count)*(U count). Note that the values for V count U count are found in the count table at count number field 615.

Referring now to FIG. 8, in the step 805, block ID pairs stored in the connection table are merged. Assume that the values for the connection table record 505 are as follows: block ID 515 is V and block ID 520 is U. Step 805 is described in detail next with reference to FIGS. 9 and 10.

Figure 9:
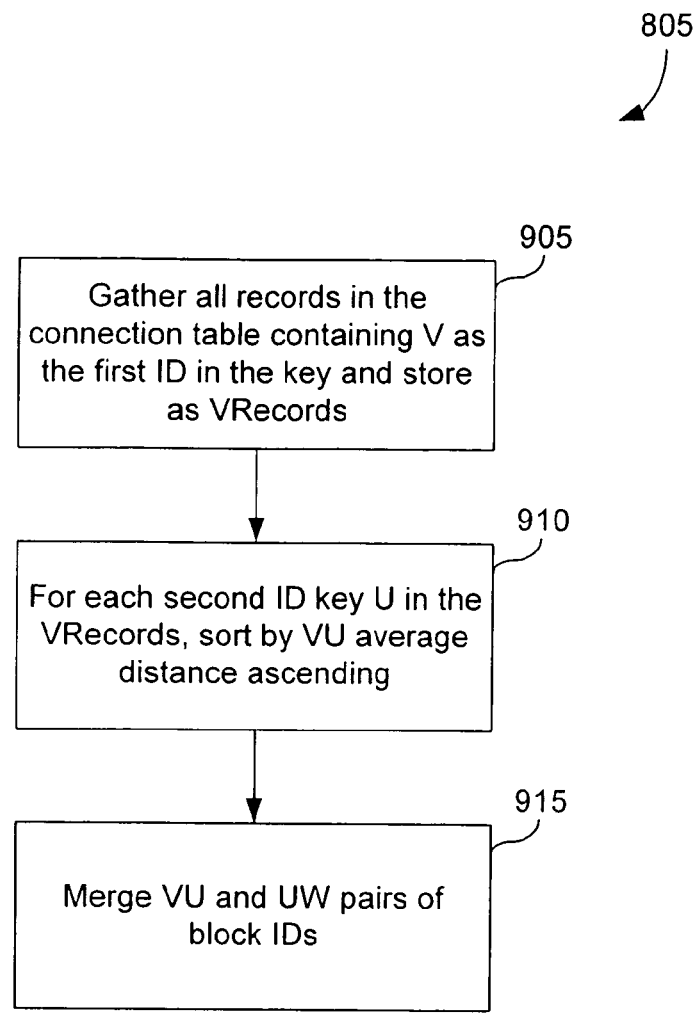
FIG. 9 is a flow chart further describing step 805 of FIG. 8 according to an embodiment of the invention.

FIG. 9 starts in step 905 where all of the records in the connection table that contain V as the first ID in the key (i.e., block ID 515) are gathered and stored in a file called VRecords.

In step 910, for each second ID key U (i.e., block ID 520) in the VRecords, sort by V U average distance, ascending.

In step 915, merge V U and UW pairs of block IDs. Step 915 is further described next with reference to FIG. 10.

Figure 10:
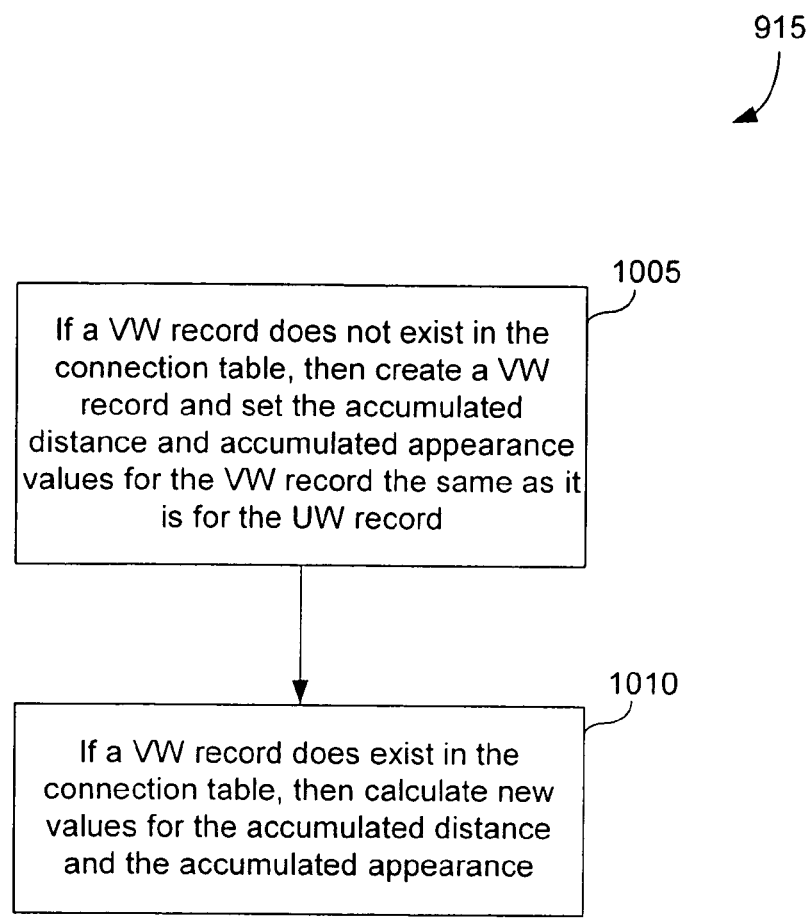
FIG. 10 is a flow chart further describing step 915 of FIG. 9 according to an embodiment of the invention.

FIG. 10 starts in step 1005 where it is determined whether a V W record exists in the connection table. If not, then a V W record is created in the connection table. The V W record is assigned the same values for its accumulated distance number and accumulated appearance number (accumulated distance number 525 and accumulated appearance number 530, respectively) as is stored for the U W record.

In step 1010, if a V W record already exists in the connection table, then new values are calculated for its accumulated distance number and accumulated appearance number values. In an embodiment of the present invention, the new value for the accumulated distance number is calculated as follows:

New accumulated appearance of V W=maximum of APP_VW and APP_UW, where APP_XY is the accumulated appearance value of the XY record.

The new value for the accumulated distance number is calculated as follows:

New accumulated distance of $V\,W=(D\_VW*APP\_VW+(D\_VU+D\_VW)*APP\_UW)/(APP\_VW+APP\_UW)*$(New accumulated appearance), where D_VW is the VW average distance value of the VW record, D_VU is the VU average distance value of the VU record, APP_VW is the accumulated appearance value of the VW record, and APP_UW is the accumulated appearance value of the UW record.

The flowchart in FIG. 10 ends at this point.

Figure 11:
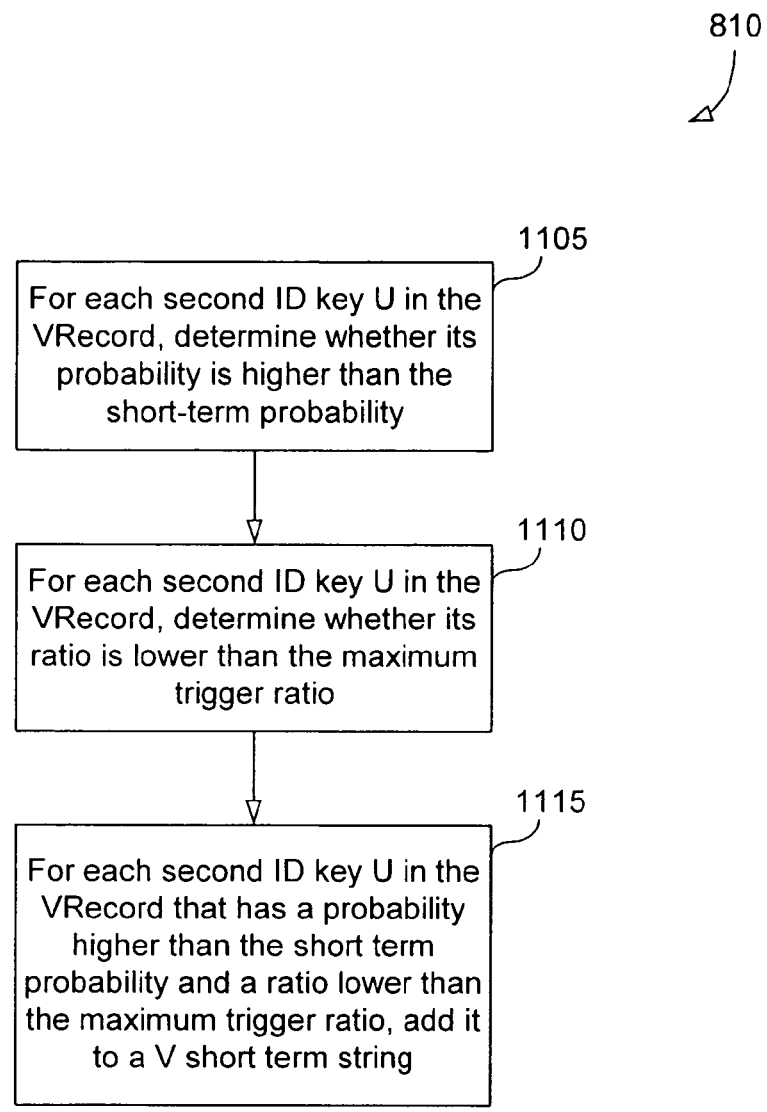
FIG. 11 is a flow chart further describing step 810 of FIG. 8 according to an embodiment of the invention.
Figure 12:
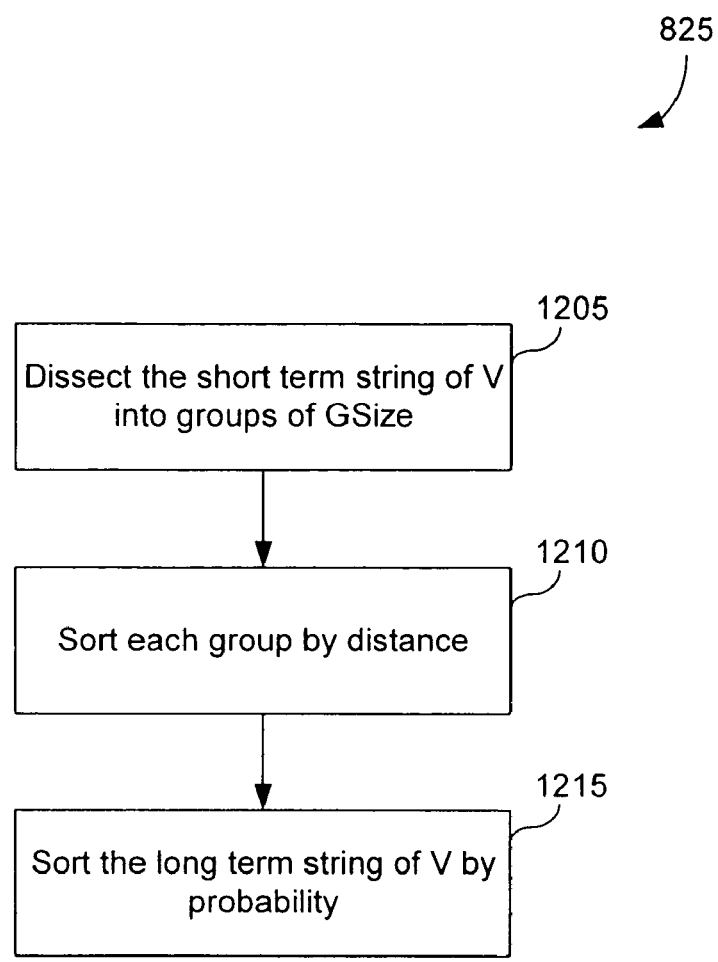
FIG. 12 is a flow chart further describing step 825 of FIG. 8 according to an embodiment of the invention.

Returning to FIG. 8, in step 810 short term strings are created. FIG. 11 describes step 810 in more detail. In step 1105 of FIG. 11, for each second ID key U in the Vrecord, it is determined whether its probability is higher than the limit probability for short term (LPShort).

In step 1110, for each second ID key U in the Vrecord, it is determined whether its ratio is lower than the maximum trigger ratio (MTRatio).

In step 1115, for each second ID key U in the Vrecord that has a probability higher than the limit probability for short term (LPShort) and has a ratio lower than the maximum trigger ratio (MTRatio), add it to a V short term string. The flowchart in FIG. 11 ends at this point.

Step 815 of FIG. 8 is described next. In step 815, all triggers are deleted if their short term string length is lower than the minimum prediction string size (Min_String_Size). Here, for each second ID key U in the Vrecord, if the short term string length of V (VshortTerm) plus Certain V size is less than Min_String_Size, then mark V as not being a trigger. A trigger may be represented as a block ID that indicates a string of block IDs in a certain probability will follow after it. Examples of a trigger could be when a user opens a certain file, closes a certain file, finishes a certain level in a game, and so forth.

In step 820, long term strings are created. Here, all triggers that exceed the long term limit probability (LPLong) are added to the long term string. Here, for each second ID key U in the Vrecord, if the probability is more than LPLong, then add it to the long term string of V (called VLongTerm).

In step 825, all of the short and long term strings are sorted. Step 825 is described in more detail with reference to FIG. 12. In step 1205 of FIG. 12, the short term string of V (VShortTerm) is ordered based on GSize. In step 1210, each group is sorted by distance. In step 1215, the long term string of V (VLongTerm) is sorted by probability. The flowchart in FIG. 12 ends at this point.

Returning to FIG. 8, step 830 is described next. In step 830, the triggers scheme data structure is created. From the above calculations, all of the triggers and their predicated block IDs, certain IDs, short term IDs and the most probable triggers that come after each trigger are determined. In an embodiment of the invention, the triggers scheme data structure is a header with the LPLong value, the Gsize value and the number of triggers value. For each trigger sorted by IDs, the triggers scheme data structure also has the triggers ID and its long and short term strings offset from the beginning of the triggers scheme data structure. Also included in the triggers scheme data structure is a boolean flag that indicates if a particular trigger has long term prediction or not. Also included in the triggers scheme data structure is compressed metadata for each trigger, first with the certain group, then the short term strings, and lastly with the long term strings. The flowchart in FIG. 8 ends at this point.

Returning to FIG. 4, in step 430 the player 131 (of client 105) uses the prediction file to determine if the client 105 is attempting to copy the application and/or user the application without authorization. This step is described next in more detail with reference to FIG. 13.

Figure 13:
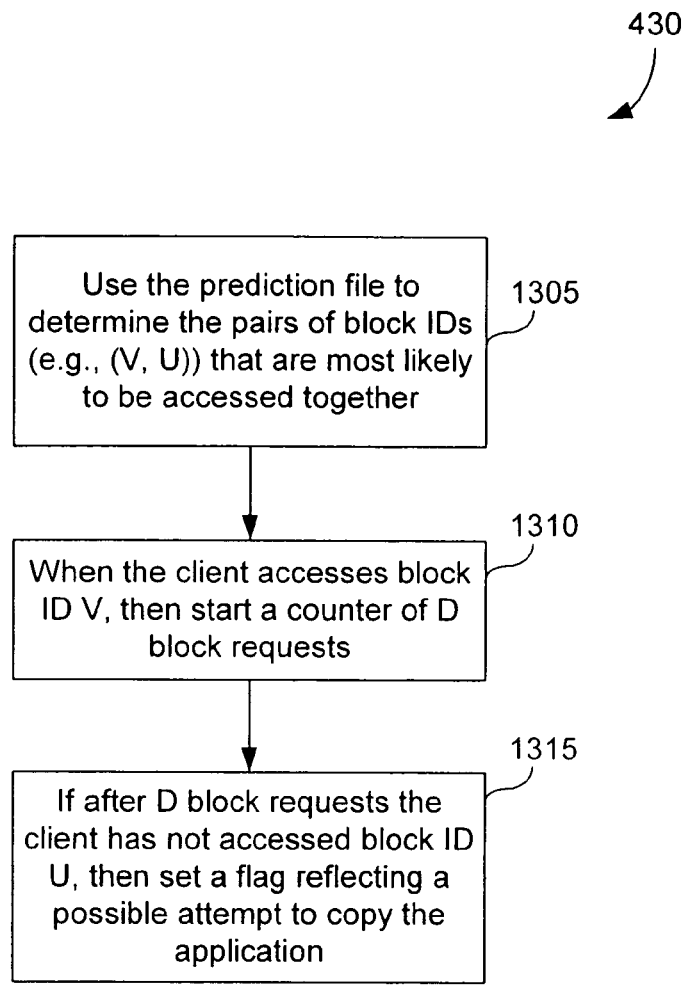
FIG. 13 is a flow chart further describing step 430 of FIG. 4 according to an embodiment of the invention.

In step 1305 of FIG. 13, the prediction file is used to determine the pairs of block IDs that are most likely to be accessed together. Assume one of the pairs of block IDs that are most likely to be accessed together is U V. In step 1310, when the client accesses block V, then a counter is set to reflect a predefined number of block requests. In step 1315, if the client has not accessed block U after the predefined number of block requests, then a flag is set reflecting a possible attempt to copy the application and/or use the application without authorization.

Another concept of the present invention, called sequence scheme, is described next. Generally, different prediction methods, or schemes, perform with different degrees of precision. Different schemes can therefore be assigned priorities. If the trigger scheme (described above) yields no prediction, then the sequence scheme can be used. The sequence scheme of the present invention is therefore a lower priority scheme. In an embodiment of the present invention, the sequence scheme is a predefined string of block IDs where the order of blocks in the sequence is determined statistically from application log files.

Figure 14:
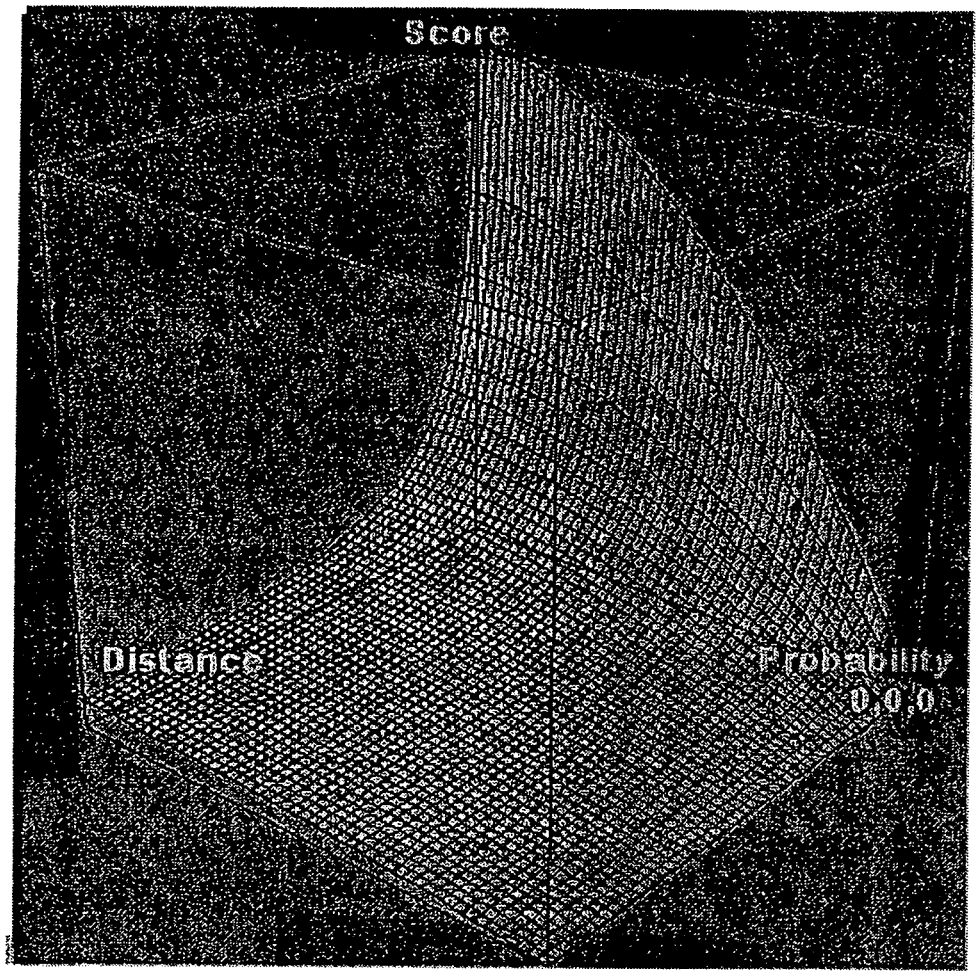
FIG. 14 is a graph that illustrates probability, average distance and score variables according to an embodiment of the invention.

There are two dominant parameters that affect the ordering of the block IDs in the predefined string of block IDs of the sequence scheme. The first is the probability of the block IDs appearing in the sequence of an application log. The second is the unique distance of the block ID from the beginning of the sequence. To create a one dimensional predefined string of block IDs two values need to be determined to produce a score for each block ID in the predefined string. The two values include a probability and an average distance. The block IDs are then sorted according to their score. The probability, average distance and score are calculated as follows and are illustrated in FIG. 14.

$$\text{Probability} = \text{Count}/\text{Number of sequences}$$

$$\text{Average Distance} = \text{Accumulated Distance from beginning}/\text{Count}$$

$$\text{Score} = (1-(1-\text{Probability})^2)/(\text{Average Distance})$$

The present invention utilizes the appearance table and the number of sequences value to sort the block IDs in descending order according to the score formula above. The score formula gives the best score for block IDs that have the best probability and the shortest distance from the beginning. The score formula gives more priority to blocks that appear less than a 100% of the time if they appear very close to the beginning of a sequence, and less priority to blocks that appear 100% of the time if they appear a very large distance from the beginning of a sequence. The underlying abnormality detector theory of the prediction based security invention may be applied to many applications. For example, the same theory could be applied to how a user types at a keyboard. Here, it can be determined how fast a user types, the force a user applies to each key, the general rhythm of a user when typing, and so forth. The invention would collect this information and use it to create prediction log files and then use the prediction log files to create a prediction file. The prediction file would be sent to a client executing an application. If the user does not type on the keyboard in the predicted manner (as stored in the prediction file), then this could indicate an unauthorized user or other abnormality, and the connection between the client and the application server would be terminated.

A more particular example of this would be evaluation of the way a user is typing his user name and password. More specifically, the time between each key stroke while typing the user name and password could be predicted statistically In general, the present invention is not limited to the applications described herein, but may be applied to any application where a user's actions can be recorded and predicted.

III. Offline Security

As described above, an application can also be accessed and executed in an offline mode. In such a mode, the application is read from an offline medium, such as a compact disk, etc., rather than being accessed by a client online. Because the user has greater control over the application offline, it is difficult to control the user's access to an application in this mode.

The goal of the offline security feature of the present invention is to control a user's access to an application in the offline mode. One example of a situation in which such access control would be desirable would be during the marketing of an application where the application is supplied to a user offline, wherein the user is allowed to try the application on a limited basis before buying the application. Here, the user might be allowed to start the application some fixed number of times, or use the application for some time interval, or otherwise use some application function on a limited basis. After having used the application for the designated number of trials or after having used the application for the predefined period, further access to the application would be denied unless the user were to actually purchase the application. Similarly, the user may have purchased an application such that the sale was intended to be for a limited use. This would be analogous to renting the application for some fixed number of startups, etc., after which further access to the application would be denied.

The invention solves this problem by binding two forms of user data. The first is referred to as usage information. Usage information can be viewed as a set of parameters that describe how the user has used the application content. In the context of a game, for example, user data could include the number of times the game has been played, the total time for which the game has been played, and/or other parameters. These parameters would normally be updated as the user accesses the content. Playing the game for an additional ten minutes, for example, would result in incrementing the playtime parameter by ten minutes. Similarly, each time the game is started, the play count parameter would be incremented by one.

The second form of data used by the invention is referred to as user saved data. This refers to data that is normally saved by a user while running the program. In the context of a game, user saved data would include saved games. In the context of a word processing application, user saved data would include saved documents. In any case, usage information is important to the end user and the end user wants to be able to access it in future sessions of the application.

In this invention, usage data is bound to user saved data. The binding is performed such that accessing or altering usage data, when not authorized, corrupts the saved data. This deters the user from running the application, and can, in some circumstances, prevent the user from running the application further. The usage data and the user saved data are stored collectively in a repository. The repository can take any of several forms, such as a database, a cache, or other data structure, as would be known to a person of skill in the art. As will be described in greater detail below, the alteration of anything in the repository damages the integrity of all data in the repository. Alternatively, such alteration could block any additional usage of the application without authorization (e.g., the user's purchase of the application). In any case the user will be able to continue running the application and use its saved data only after buying the application or otherwise obtaining authorization.

Figure 15:
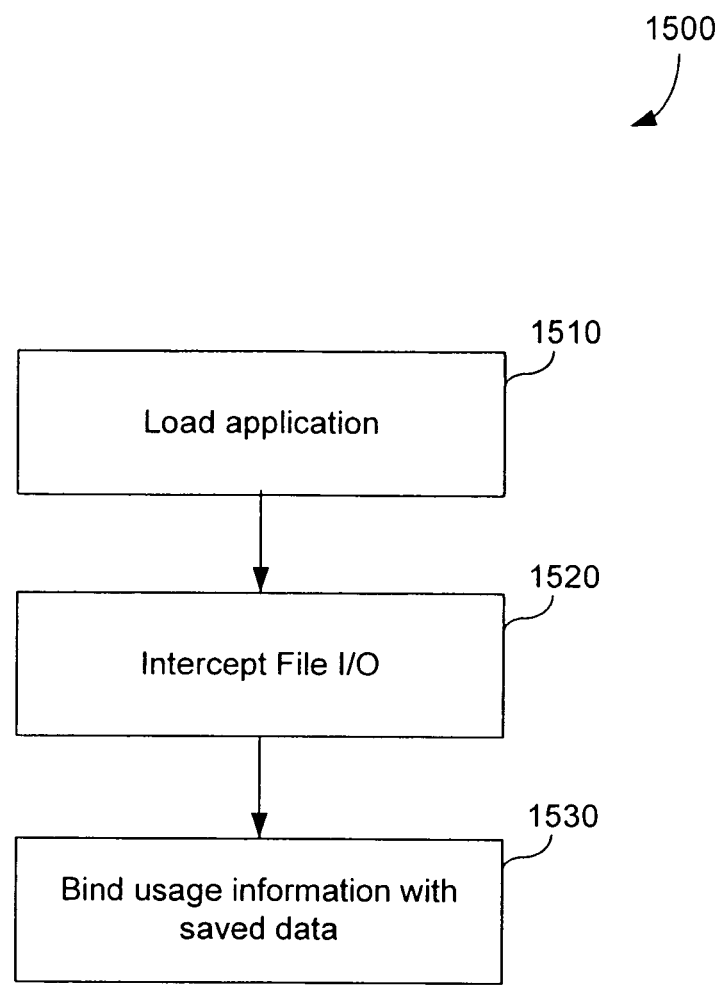
FIG. 15 is a flow chart illustrating the offline security process, according to an embodiment of the invention.

The offline security process is illustrated generally in FIG. 15. In step 1510, the application is loaded. In step 1520, any file I/O that results from execution of the application is intercepted for purposes of redirection to a repository. While an application is running, the application typically writes data to the hard disk or other storage device from time to time. One method by which such file I/O can be intercepted is by the setting of file system hooks. A file system hook is a function that is installed instead of the normal file system service function for a specific service. The file system's original service function is a function supplied by the operating system that serves one or more operations for the application or for the operating system. Examples of such functions include those which open a file, write to a file, or find a file. In an embodiment of the invention, alternative versions of such functions are created and replace the standard versions of such functions. The new functions then receive all requests to do, say, an open file operation. This new function is called whenever a file open process is required by the application. Such a request that is not generated by the application is handled by calling the original file system service function. The new version of the open file function (or the write function, or the read function) serves to redirect the I/O to or from the repository. In other embodiments of the invention, the interception of file I/O can be performed by file system filtering, or by replacing appropriate file system APIs using the software development kit (SDK), as would be known to a person of skill in the art. In step 1530, the usage information is bound with the user saved data, in a manner to be described in greater detail below.

Figure 16:
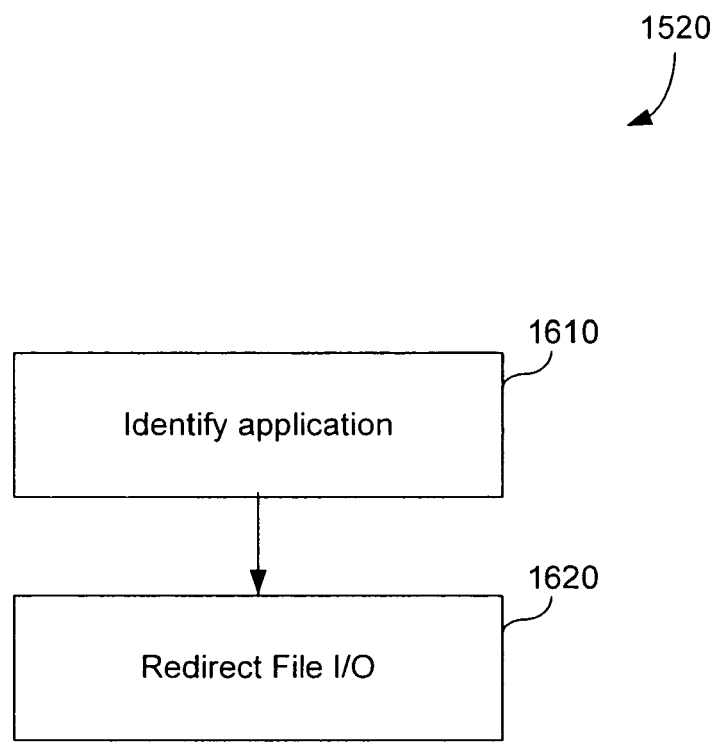
FIG. 16 is a flow chart further illustrating step 1520 of FIG. 15, according to an embodiment of the invention.

Step 1520, the step of intercepting file I/O, is illustrated in greater detail in FIG. 16. In step 1610, the application is identified. Only by establishing the application's identity can it be determined that this application is an application of interest, such that its I/O must be redirected. This identification information is referred to as a process ID. In some system contexts, the operation system provides a service by which the process ID can be retrieved. If the operating system does not supply such as service, an API can be used to derive a process ID that will be used every time there is a need to identify the application. The derivation of a process ID is well known to those of skill in the art. The process ID of the application of interest can then be compared to the process ID of an application that is issuing a file I/O request. If the process ID refers to an application of interest, then redirection of I/O can be performed.

Note that retrieving an application's process ID can be done in several ways. An operating system's application launcher can be intercepted, for example. This can be done by hooking the process creation API. Alternatively, the software development kit can be used to create an interface to retrieve the process ID from a running application. In any event, for every request for file I/O, the process ID of the current caller is determined and compared to the process ID of the application of interest.

In step 1620, the file I/O is redirected to the repository. All data that the application of interest requests to be saved, is saved in the repository. Likewise, any data that the application requests to be read is fetched from the repository and directed to the application. This two-way of redirection is performed by interception of both write and read operations.

The binding of user saved data and usage information can be implemented in a variety of ways. Generally, an integrity function can be implemented. For example, the user saved data can be stored with the usage information, and a cyclic redundancy code (CRC) can be calculated on the aggregate data. The CRC can then be stored as part of the repository's metadata. Any unauthorized access to the repository to modify usage information results in a body of data that will not yield the stored CRC. If the CRC is calculated on the modified repository data and the result compared to the stored CRC, a mismatch results. A mismatch therefore implies that data in the repository has been altered. If a mismatch in CRCs is detected, then further access to the repository may not be permitted, and the user is denied access to user saved data. The unauthorized user is forced to buy the application or otherwise obtain the necessary authorization to use the application, in order to continue accessing the saved data.

In an alternative embodiment, the user saved data is encrypted using a CRC that is generated on the basis of the usage information. In this case, changes to the usage information make the saved data invalid. This is because the revised usage information results in a revised CRC. Use of this revised CRC to decrypt saved data will result in invalid saved data. In general, such integrity checks are imposed at an appropriate time, e.g., after the trial period has concluded for the application. This keeps a user from manipulating the usage data, which would allow the user to use the application beyond the trial period.

Figure 17:
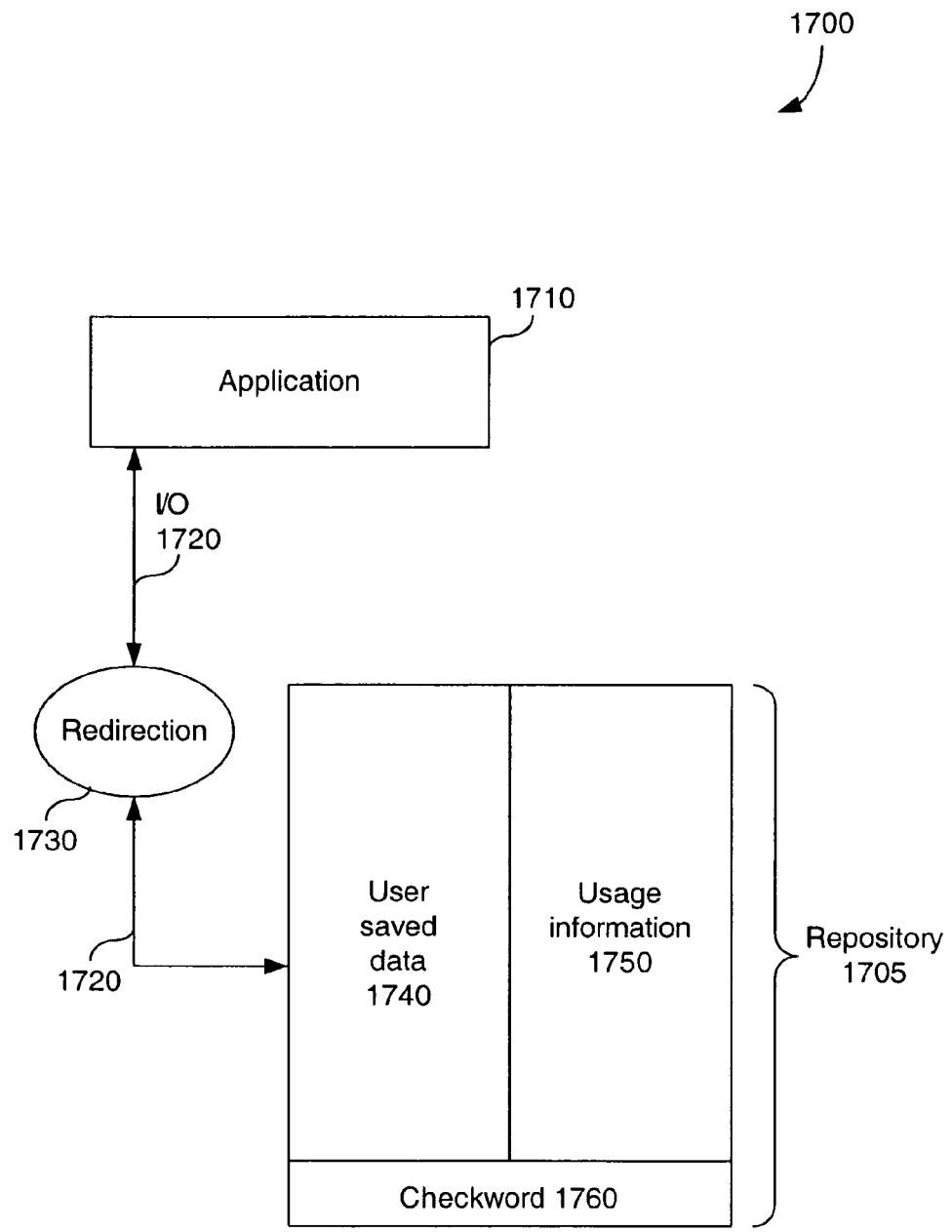
FIG. 17 is a block diagram illustrating the data repository and associated processing, according to an embodiment of the invention.

The structure of the repository is illustrated in FIG. 17. A repository 1705 is shown with an application 1710. I/O 1720 to and from application 1710 is redirected by process 1730 to repository 1705. The repository 1705 is shown to include user saved data 1740 and usage information 1750. Also included in repository 1705 is a checkword 1760. Checkword 1760 is some function of both user saved data 1740 and usage information 1750. An example of checkword 1760 is the CRC described above.

In an alternative embodiment of the invention, the usage data can be bound with license information for this or some other application. Conceptually, license information replaces usage information 1750 above. In this case, unauthorized alteration of usage data effectively corrupts or otherwise denies access to the license information. This serves to invalidate the license, and prevents further access of the application.

IV. Computing Context

Figure 18:
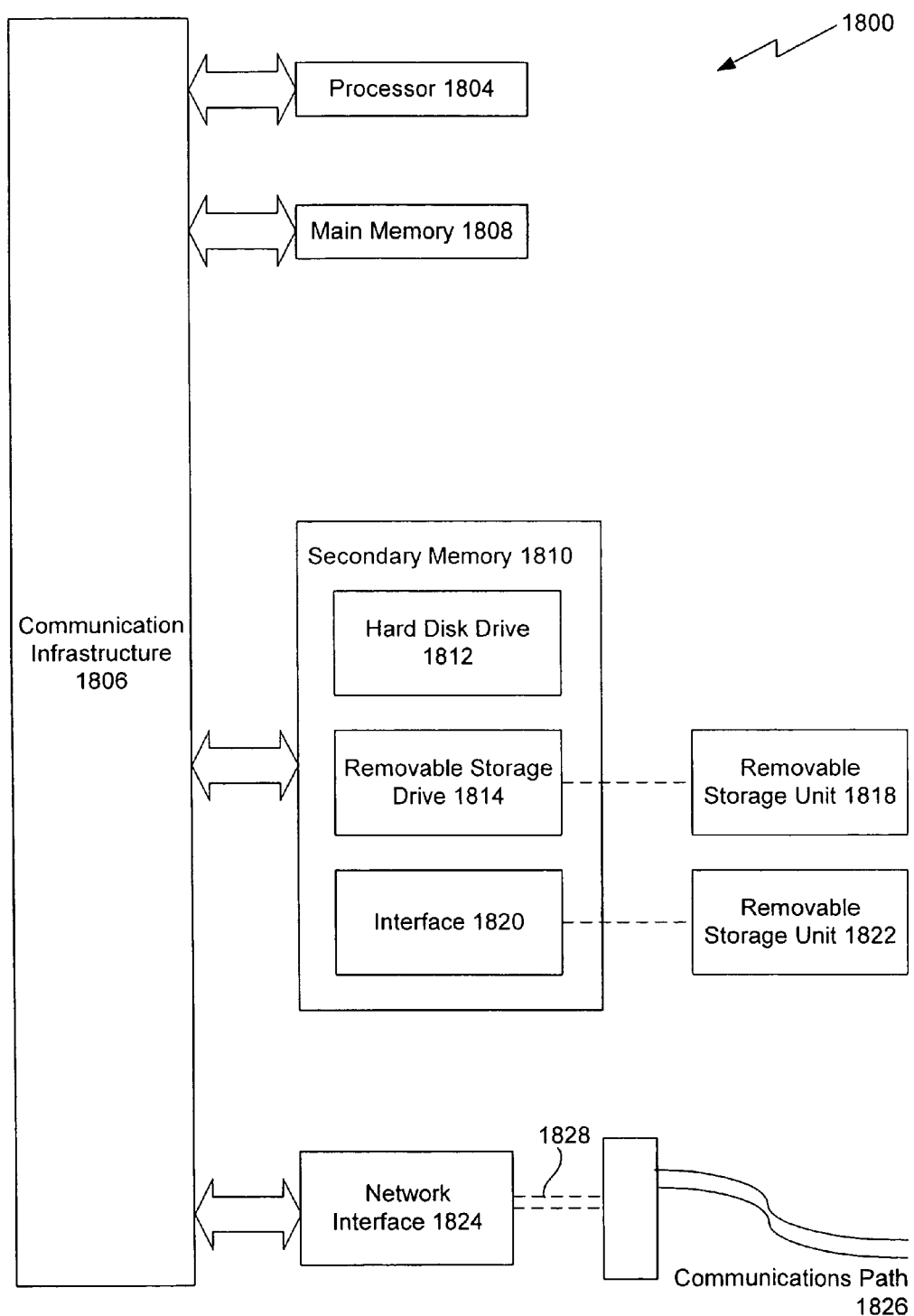
FIG. 18 is a block diagram illustrating an embodiment of the computing context of the invention.

The logic of the present invention may be implemented using hardware, software or a combination thereof. In an embodiment of the invention, the security prediction and offline security processes are implemented in software that executes on prediction server 205 and client 105. Generally, each of these machines is a computer system or other processing system. An example of such a computer system 1800 is shown in FIG. 18. The computer system 1800 includes one or more processors, such as processor 1804. The processor 1804 is connected to a communication infrastructure 1806, such as a bus or network. After reading this description, it will become apparent to a person skilled in the relevant art how to implement the invention using other computer systems and/or computer architectures.

Computer system 1800 also includes a main memory 1808, preferably random access memory (RAM), and may also include a secondary memory 1810. The secondary memory 1810 may include, for example, a hard disk drive 1812 and/or a removable storage drive 1814. The removable storage drive 1814 reads from and/or writes to a removable storage unit 1818 in a well known manner. Removable storage unit 1818 represents a floppy disk, magnetic tape, optical disk, or other storage medium which is read by and written to by removable storage drive 1814. The removable storage unit 1818 includes a computer usable storage medium having stored therein computer software and/or data.

In alternative implementations, secondary memory 1810 may include other means for allowing computer programs or other instructions to be loaded into computer system 1800. Such means may include, for example, a removable storage unit 1822 and an interface 1820. Examples of such means may include a removable memory chip (such as an EPROM, or PROM) and associated socket, and other removable storage units 1822 and interfaces 1820 which allow software and data to be transferred from the removable storage unit 1822 to computer system 1800.

Computer system 1800 may also include a communications interface 1824. Communications interface 1824 allows software and data to be transferred between computer system 1800 and external devices. Examples of communications interface 1824 may include a modem, a network interface (such as an Ethernet card), a communications port, a PCM-CIA slot and card, etc. Software and data transferred via communications interface 1824 are in the form of signals 1828 which may be electronic, electromagnetic, optical or other signals capable of being received by communications interface 1824. These signals 1828 are provided to communications interface 1824 via a communications path (i.e., channel) 1826. This channel 1826 carries signals 1828 and may be implemented using wire or cable, fiber optics, a phone line, a cellular phone link, an RF link and other communications channels.

In this document, the terms "computer program medium" and "computer usable medium" are used to generally refer to media such as removable storage units 1818 and 1822, a hard disk installed in hard disk drive 1812, and signals 1828. These computer program products are means for providing software to computer system 1800.

Computer programs (also called computer control logic) are stored in main memory 1808 and/or secondary memory 1810. Computer programs may also be received via communications interface 1824. Such computer programs, when executed, enable the computer system 1800 to implement the present invention as discussed herein. In particular, the computer programs, when executed, enable the processor 1804 to implement the present invention. Accordingly, such computer programs represent controllers of the computer system 1800. Where the invention is implemented using software, the software may be stored in a computer program product and loaded into computer system 1800 using removable storage drive 1814, hard drive 1812 or communications interface 1824.

V. Conclusion

While some embodiments of the present invention has been described above, it should be understood that it has been presented by way of examples only, and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents. Each document cited herein is hereby incorporated by reference in its entirety.

What is claimed is:

1. A method for determining whether a client is attempting to copy an application or use the application without authorization, the method comprising:

creating data for at least one prediction log file for the application;

forwarding the at least one prediction log file to a prediction server;

based on said at least one prediction log file, determining prediction knowledge for the application, wherein said prediction knowledge is indicative of authorized use of the application and wherein said prediction knowledge is stored in a prediction file;

forwarding said prediction file to the client executing the application; and using said prediction file to detect abnormalities and determine whether the client is attempting to copy the application or use the application without authorization.

2. The method of claim 1, further comprising:

if it is determined that the client is attempting to access the application without authorization, then terminating the client's access to the application.

3. The method of claim 1, wherein the step of creating comprises:
    merging block IDs;
    creating short term strings;
    deleting triggers;
    creating long term strings;
    sorting said short term strings and said long term strings; and
    creating the triggers scheme data structure to create said at least one prediction log file.

4. The method of claim 3, wherein the step of merging block IDs comprises:
    gathering at least one record in a connection table, wherein said at least one record has a first ID key and an second ID key;
    sorting said gathered records by said second ID key, wherein said second ID key in said sorted records is sorted by average distance ascending; and
    merging said gathered records with said first ID key and said second ID key with records with said second ID key and a third ID key to create records with said first ID key and said third ID key.

5. The method of claim 1, wherein the step of using said prediction file comprises:
    using said prediction file to determine pairs of block IDs that are most likely to be accessed together, wherein said pairs of block IDs has a first ID block and a second ID block;
    when the client accesses said first ID block, then starting a counter of D block requests; and
    after D block requests if the client has not accessed said second ID block, then indicating that the client is attempting to copy the application or use the application without authorization.

6. A system for determining whether a client is attempting to copy an application or use the application without authorization, the method comprising:
    a module to create data for at least one prediction log file for the application;
    a module to forward the at least one prediction log file to a prediction server;
    a module to determine prediction knowledge for the application based on said at least one prediction log file, wherein said prediction knowledge is indicative of authorized use of the application and wherein said prediction knowledge is stored in a prediction file;
    a module to forward said prediction file to the client executing the application; and
    a module to use said prediction file to detect abnormalities and determine whether the client is attempting to copy the application or use the application without authorization.

7. The system of claim 6, further comprising:
    a module to terminate the client's access to the application if it is determined that the client is attempting to access the application without authorization.

8. The system of claim 6, wherein the the module for creating comprises at least one of:
    means for merging block IDs;
    means for creating short term strings;
    means for deleting triggers;
    means for creating long term strings;
    means for sorting said short term strings and said long term strings; and
    means for creating the triggers scheme data structure to create said at least one prediction log file.

9. The system of claim 8, wherein the means for merging block IDs comprises:
    means for gathering at least one record in a connection table, wherein said at least one record has a first ID key and an second ID key;
    means for sorting said gathered records by said second ID key, wherein said second ID key in said sorted records is sorted by average distance ascending; and
    means for merging said gathered records with said first ID key and said second ID key with records with said second ID key and a third ID key to create records with said first ID key and said third ID key.

10. The system of claim 6, wherein the module for using said prediction file comprises:
    means for using said prediction file to determine pairs of block IDs that are most likely to be accessed together, wherein said pairs of block IDs has a first ID block and a second ID block;
    means for starting a counter of D block requests when the client accesses said first ID block; and
    means for indicating that the client is attempting to copy the application or use the application without authorization after D block requests if the client has not accessed said second ID block.

11. A client based method for determining whether a client is attempting to copy an application or use the application without authorization, the method comprising:
    creating data for at least one prediction log file for the application;
    forwarding the prediction log file to a prediction server, wherein the prediction server (i) receives prediction log file, (ii) determines prediction knowledge for the application based the prediction log file, and (iii) stores the prediction knowledge in a prediction file, said prediction file being indicative of authorized use of the application;
    receiving the prediction file at the client executing the application; and
    using said prediction file to detect abnormalities and determine whether the client is attempting to copy the application or use the application without authorization.

12. The method of claim 11, wherein the client's access to the application is terminated if it is determined that the client is attempting to access the application without authorization.

13. The method of claim 11, wherein the step of creating comprises:
    merging block IDs;
    creating short term strings;
    deleting triggers;
    creating long term strings;
    sorting said short term strings and said long term strings; and
    creating the triggers scheme data structure to create said at least one prediction log file.

14. The method of claim 13, wherein the step of merging block IDs comprises:
    gathering at least one record in a connection table, wherein said at least one record has a first ID key and an second ID key;
    sorting said gathered records by said second ID key, wherein said second ID key in said sorted records is sorted by average distance ascending; and
    merging said gathered records with said first ID key and said second ID key with records with said second ID key and a third ID key to create records with said first ID key and said third ID key.

15. The method of claim 11, wherein the step of using said prediction file comprises:

using said prediction file to determine pairs of block IDs that are most likely to be accessed together, wherein said pairs of block IDs has a first ID block and a second ID block;

when the client accesses said first ID block, then starting a counter of D block requests; and after D block requests if the client has not accessed said second ID block, then indicating that the client is attempting to copy the application or use the application without authorization.

16. A server based method for determining whether a client is attempting to copy an application or use the application without authorization, the method comprising:

receiving at a prediction server a prediction log file for the application;

determining prediction knowledge for the application based on the prediction log file said prediction knowledge being indicative of authorized use of the application;

forwarding said prediction knowledge to the client executing the application, wherein the client uses said prediction knowledge to detect abnormalities and determine whether the client is attempting to copy the application or use the application without authorization.

17. The method of claim 16, wherein client's access to the application is terminated if it is determined that the client is attempting to access the application without authorization.

18. The method of claim 16, wherein the prediction knowledge is created using a method comprising:

merging block IDs;

creating short term strings;

deleting triggers;

creating long term strings;

sorting said short term strings and said long term strings; and creating the triggers scheme data structure to create said at least one prediction log file.

19. The method of claim 18, wherein the step of merging block IDs is comprises:

gathering at least one record in a connection table, wherein said at least one record has a first ID key and an second ID key;

sorting said gathered records by said second ID key, wherein said second ID key in said sorted records is sorted by average distance ascending; and merging said gathered records with said first ID key and said second ID key with records with said second ID key and a third ID key to create records with said first ID key and said third ID key.

20. The method of claim 16, wherein the client executing the application performs the following steps:

using said prediction knowledge to determine pairs of block IDs that are most likely to be accessed together, wherein said pairs of block IDs has a first ID block and a second ID block;

when the client accesses said first ID block, then starting a counter of D block requests; and after D block requests if the client has not accessed said second ID block, then indicating that the client is attempting to copy the application or use the application without authorization.

* * * * *